United States Patent
Kim et al.

(10) Patent No.: US 8,937,116 B2
(45) Date of Patent: Jan. 20, 2015

(54) RESIN COMPOSITION FOR FORMING HARD COATING

(75) Inventors: Yun-Bong Kim, Daejeon (KR); Won-Kook Kim, Daejeon (KR); Dong-Joo Gwon, Daejeon (KR); Yang-Gu Kang, Daejeon (KR); Jin-Woo Kim, Daejeon (KR); Mu-Seon Ryu, Seoul (KR)

(73) Assignee: LG Hausys, Ltd., Seoul (KR)

( * ) Notice: Subject to any disclaimer, the term of this patent is extended or adjusted under 35 U.S.C. 154(b) by 133 days.

(21) Appl. No.: 13/395,206

(22) PCT Filed: Feb. 9, 2011

(86) PCT No.: PCT/KR2011/000878
§ 371 (c)(1),
(2), (4) Date: Apr. 9, 2012

(87) PCT Pub. No.: WO2011/099778
PCT Pub. Date: Aug. 18, 2011

(65) Prior Publication Data
US 2012/0184640 A1    Jul. 19, 2012

(30) Foreign Application Priority Data
Feb. 10, 2010    (KR) .................. 10-2010-0012460

(51) Int. Cl.
| C08G 59/18 | (2006.01) |
| C08G 59/20 | (2006.01) |
| C08G 59/14 | (2006.01) |
| C08G 59/17 | (2006.01) |
| C08L 63/10 | (2006.01) |
| G02B 1/10 | (2006.01) |
| C08G 18/79 | (2006.01) |
| C09D 175/04 | (2006.01) |
| C08G 18/38 | (2006.01) |
| C09D 133/06 | (2006.01) |
| C08K 5/37 | (2006.01) |

(52) U.S. Cl.
CPC .............. *G02B 1/105* (2013.01); *C08G 18/792* (2013.01); *C09D 175/04* (2013.01); *C08G 18/3876* (2013.01); *C09D 133/068* (2013.01); *C08K 5/37* (2013.01)
USPC ........... 523/401; 522/100; 522/113; 522/118; 522/170; 522/181; 523/427; 523/428; 523/456; 264/340; 264/345; 264/347

(58) Field of Classification Search
USPC ................. 522/100, 180, 113, 118, 170, 181; 523/400, 401, 427, 428, 456; 264/340, 264/345, 347
See application file for complete search history.

(56) References Cited

U.S. PATENT DOCUMENTS

| 4,439,291 A * | 3/1984 | Irving et al. ................. 522/34 |
| 2009/0047531 A1 | 2/2009 | Bartley et al. |

FOREIGN PATENT DOCUMENTS

| CN | 1733855 A | 2/2006 |
| EP | 1777269 A1 | 4/2007 |
| JP | 59086001 | 5/1984 |
| JP | H07233242 A | 9/1995 |
| JP | 08207500 | 8/1996 |
| JP | 11-256013 A | 9/1999 |
| JP | 2002-502903 A | 1/2002 |
| JP | 2006-052260 A | 2/2006 |
| JP | 2006089623 A * | 4/2006 |
| JP | 2008-069303 A | 3/2008 |
| JP | 2010024255 A | 2/2010 |
| KR | 10-2008-0061703 A | 7/2008 |
| WO | 2009025967 A1 | 2/2009 |

* cited by examiner

*Primary Examiner* — Sanza McClendon
(74) *Attorney, Agent, or Firm* — Nath, Goldberg & Meyer; Joshua B. Goldberg; Sheldon M. McGee (57) ABSTRACT

The present invention relates to a sheet for forming a hard coating and a method of formation thereof. The present invention can provide a transfer material or a surface protection sheet having a high refractive index and superior physical properties, such as hardness, friction resistance, abrasion resistance, chemical resistance, transparency, luster, and the like, for forming a hard coating on the surface of various molded products, including resin molded products or wood products, and a method for forming a hard coating from such transfer material or surface protection sheets.

17 Claims, 5 Drawing Sheets

RESIN COMPOSITION FOR FORMING HARD COATING

This is a National Phase Application filed under 35 U.S.C. 371 as a national stage of PCT/KR2011/000878, filed Feb. 9, 2011, and claims priority benefit from Korean Application No. 10-2010-0012460, filed Feb. 10, 2010, the content of each of which is hereby incorporated by reference in its entirety.

TECHNICAL FIELD

The present invention relates to a resin composition for forming a hard coating, a sheet for forming a hard coating, and a method of forming a hard coating.

BACKGROUND ART

Various methods are used to form a hard coating (also referred to as a protective layer) having excellent abrasion resistance and chemical resistance on various molded articles, such as resin products or wooden products. For example, a sheet on which a coating layer is formed of a photo-curable resin composition on a release coating layer of a base having release properties (such sheets are referred to as a "transfer material") may be used. In this case, the coating layer is attached to the surface of a molded article, and the base is separated, thereby forming a hard coating. Another method of forming a hard coating uses a sheet in which a coating layer is formed on one side of a base having no release properties and an adhesive layer is formed on the opposite side of the base as needed (such a sheet is referred to as a "surface protective sheet"). In this method, the base of the surface protective sheet is attached to the surface of a molded article to form a hard coating.

The transfer material or surface protective sheet may include a decorative layer, such as a patterned layer or deposition layer, in a proper position as necessary. The transfer material mostly includes a patterned layer or deposition layer formed between the base and the coating layer, and the surface protective sheet generally includes a patterned layer or deposition layer formed on an opposite side of the base to the coating layer.

When forming a hard coating using a transfer material or a surface protective sheet, a pre-curing process is carried out, in which light is irradiated prior to application of the transfer material or surface protective sheet to a molded article to photo-cure a coating layer. However, in the pre-curing process, when the transfer material or surface protective sheet is applied to the molded article, a cured hard coating may be separated from a curved potion or cracks may occur on the hard coating.

Thus, in application to a molded article, an un-cured coating layer is bonded to the surface of the molded article and then cured, which is referred to as an after-curing method. However, the after-curing process has the following problems.

A transfer material or surface protective sheet is generally prepared using a machine, such as a gravure rotary printing machine. However, when the post-curing process is used to form, for example, a patterned layer, a deposition layer, or an adhesive layer on a coating layer in forming a transfer material or to roll a sheet in forming a surface protective sheet, components of an uncured coating layer may be transferred to a guide roll or components used for forming the patterned layer or adhesive layer may be transferred to the coating layer. Further, components of the coating layer may be transferred back to the guide roll for forming the patterned layer or adhesive layer (a so-called back trapping phenomenon).

Accordingly, when the post-curing process is used, special equipment or an additional process including a drying process is involved in forming a coating layer in order to remove fluidity or tack of the coating layer before photo curing. However, in this case, the coating layer, the patterned layer, or the adhesive layer may not be formed at the same time and substantial costs of designing separate equipment are needed, thereby reducing productivity of a transfer material or surface protective sheet and considerably increasing manufacturing costs.

DISCLOSURE

Technical Problem

The present invention provides a resin composition for forming a hard coating, a sheet for forming a hard coating, and a method of forming a hard coating.

Technical Solution

An aspect of the present invention provides a resin composition for forming a hard coating, which includes a resin having an epoxy group and a (meth)acryloyl group and a thiol curing agent.

As used herein, the term "hard coating" refers to a high-hardness functional layer which imparts wear and tear resistance, abrasion resistance, scratch resistance, and chemical resistance to surfaces of various molded articles including resin, wooden, metal or complex molded articles and may refer to a functional layer employed for various display apparatuses in some cases. The term "hard coating" may be equivalent to the term "protective layer" in some cases.

Hereinafter, the resin composition according to the present invention will be described in detail.

The composition of the present invention includes a resin containing an epoxy group and a (meth)acryloyl group. Herein, the term "(meth)acryloyl group," "(meth)acrylate," and "(meth)acrylic acid" collectively refer to both an acryloyl group and a (meth)acryloyl group, to both acrylate and (meth)acrylate, and to both acrylic acid and (meth)acrylic acid, respectively.

The resin included in the resin composition may have an epoxy equivalent weight of 200 to 20,000 g/eq, preferably 2,000 to 8,000 g/eq, and more preferably 4,000 to 8,000 g/eq. The term "epoxy equivalent weight (g/eq)" refers to a value obtained by dividing the molecular weight of an epoxy group by the number of epoxy groups included in the resin. Epoxy equivalent weight may be chemically analyzed by various titration methods known in the art. In the present invention, the epoxy equivalent weight of the resin is controlled within the above range, thereby providing a resin layer having excellent process efficiency such as heat curing efficiency, exhibiting properly controlled tack or adhesion after heat curing, and having excellent physical properties including solvent resistance or chemical resistance.

In the resin composition, the resin may also have a (meth)acryloyl equivalent weight of about 100 to 1,000 g/eq, preferably about 200 to 500 g/eq. The term "(meth)acryloyl equivalent weight (g/eq)" refers to a value obtained by dividing the molecular weight of a (meth)acryloyl group by the number of (meth)acryloyl groups included in the resin. A (meth)acryloyl equivalent weight may be chemically analyzed by various titration methods generally known in the art. In the present invention, the (meth)acryloyl equivalent weight of the resin is controlled within the above range, thereby providing a hard coating layer having excellent process efficiency, such as photo curing efficiency, and exhibiting excellent physical properties including wear and tear resistance, abrasion resistance, and chemical resistance after curing.

The resin containing the epoxy group and the (meth)acryloyl group may have a weight average molecular weight of about 5,000 to 100,000, preferably about 10,000 to 80,000, and more preferably about 20,000 to 70,000. As used herein, the term "weight average molecular weight (Mw)" refers to a value obtained based on a polystyrene standard measured by gel permeation chromatography (GPC). In the present invention, the weight average molecular weight is controlled within the above range, thereby providing a hard coating layer having excellent process efficiency, such as coatability, heat curing efficiency, and photo curing efficiency, exhibiting properly controlled tack or adhesion after heat curing, and having excellent physical properties including wear and tear resistance, abrasion resistance, and chemical resistance after photo curing.

In the present invention, the resin may be prepared by any method. For example, a monomer mixture including an epoxy group containing monomer (e.g., glycidyl(meth)acrylate) is polymerized into an epoxy group containing polymer, which is subjected to addition reaction with a (meth)acryloyl group containing the compound, e.g., α,β-unsaturated monocarbonic acid (e.g., (meth)acrylic acid), thereby preparing the above resin.

In one embodiment, the monomer mixture may include glycidyl(meth)acrylate alone or include glycidyl(meth)acrylate and another comonomer as necessary.

Any comonomer which includes an α,β-unsaturated carbon-carbon double bond may be included in the monomer mixture. Examples of the comonomer may include, without being limited to, C1 to C14 alkyl group containing (meth) acrylates, styrene, vinyl acetate, or (meth)acrylonitrile. When the monomer mixture includes glycidyl(meth)acrylate and a comonomer, the amount of each monomer may not be particularly limited but be adjusted properly in consideration of desired effects. For example, the monomer mixture may include 5 to 70 parts by weight of the glycidyl(meth)acrylate and 5 to 70 parts by weight of the comonomer.

The monomer mixture may be polymerized into a polymer by any polymerization method. For example, any polymerization generally used in the art, such as solution polymerization, photopolymerization, bulk polymerization, suspension polymerization, or emulsion polymerization, may be used.

The polymer is then subjected to addition reaction with a (meth)acryloyl group containing compound, e.g., α,β-unsaturated monocarbonic acid (e.g., (meth)acrylic acid), thereby preparing the above resin. In this case, a method and conditions of the addition reaction of the polymer with the compound are not particularly limited but may be properly selected from methods and conditions generally used in the art. Further, the amount of the (meth)acryloyl group containing compound involved in addition reaction with respect to the polymer is not particularly limited but may be properly adjusted within the range in which an epoxy equivalent weight and a (meth)acryloyl equivalent weight are satisfactory. For example, the compound may be added such that the remaining amount of epoxy groups included in the polymer in addition reaction may be about 50% or less, preferably about 30% or less, and more preferably about 5% with respect to a reaction equivalent weight of α,β-unsaturated monocarbonic acid of 100% based on the amount of the epoxy group containing monomer involved in the reaction.

The resin composition of the present invention includes a thiol curing agent. As used herein, the term "thiol curing agent" refers to a compound having at least one thiol group which reacts with an epoxy group included in the resin or a carbon-carbon double bond of the compound included in the composition to primarily heat-cure the resin composition.

Any thiol curing agent may be used so long as the curing agent includes at least one thiol group, preferably at least two thiol groups.

Examples of the thiol curing agent may include at least one polythiol selected from the group consisting of ethoxylated trimethylolpropane tris(3-mercaptopropionate), trimethylolpropane tris(3-mercaptopropionate), glycol di(3-mercaptopropionate), pentaerythritol tetrakis(3-mercapto-propionate), 4-mercaptomethyl-3,6-dithia-1,8-octanedithiol, pentaerythritol tetrakis(3-mercapto acetate), trimethylolpropane tris(3-mercapto acetate), 4-t-butyl-1,2-benzenedithiol, 2-mercaptoethylsulfide, 4,4'-thiodibenzenethiol, benzenedithiol, glycol dimercaptoacetate, glycol dimercaptopropionate ethylene bis(3-mercaptopropionate), polyethylene glycol dimercaptoacetates, and polyethylene glycol di(3-mercaptopropionates).

Specifically, the thiol curing agent may include a thiol curing agent represented by Formula 1:

where $R_1$ to $R_4$ each independently represent hydrogen, alkyl, alkoxy, alkenyl, alkynyl, or a thiol containing group, and at least two, preferably at least three of $R_1$ to $R_4$ represent a thiol containing group.

As used herein, the term "alkyl" or "alkoxy" may refer to a C1 to C20, C1 to C16, C1 to C12, C1 to C8, or C1 to C4 straight, branched, cyclic or noncyclic alkyl or alkoxy group, and the alkyl or alkoxy group may be randomly substituted by at least one substituent.

Further, the term "alkenyl" or "alkynyl" may refer to a C2 to C20, C2 to C16, C2 to C12, C2 to C8, or C2 to C4 straight, branched, cyclic or noncyclic alkenyl or alkynyl group, and the alkenyl or alkynyl group may be randomly substituted by at least one substituent.

Here, examples of the substituent to substitute for the alkyl, alkoxy, alkenyl, or alkynyl group may include any substituent generally used in the field of chemistry, for example, a thiol, amine, amide, halogen, hydroxyl, carboxyl, glycidyl, cyano, nitro, hetercycloalkyl, or aryl group, without being limited thereto.

In the compound represented by Formula 1, any thiol containing group may be used so long as a substituent structure has a univalent moiety having a thiol group (—SH) at a terminal thereof. For example, the thiol containing group may be a univalent moiety represented by Formula 2:

where A is a single bond or alkylene, B is —NH(C=O)—, —OC(=O), —O-E-C(=O)—, —SC(=O)—, or —OCH$_2$—, C is a single bond or alkylene, D is a single bond or a bivalent moiety represented by Formula 3, and E is alkylene.

[Formula 3]

where P represents a bivalent aryl group, and n is an integer from 0 to 10.

In A, C or D, the term "single bond" means that there is no atom at the A, C or D position. For example, when A is a single bond, the thiol containing group is represented by —B—C—D-SH. When C is a single bond, the thiol containing group is represented by -A-B-D-SH. When D is a single bond, the thiol containing group is represented by -A-B—C—SH.

Further, the term "alkylene" may represent C1 to C20, C1 to C16, C1 to C12, C1 to C8, or C1 to C4 straight, branched, cyclic, or noncyclic alkylene, and the alkylene may be randomly substituted by at least one substituent.

In addition, the term "bivalent aryl" refers to a bivalent moiety derived from an aromatic ring compound or including the compound in the structure. For example, bivalent aryl may refer to a bivalent moiety derived from a 6 to 22-membered, 6 to 18-membered, 6 to 14-membered, or 6 to 10-membered aromatic ring compound or including these compounds in the structure and be randomly substituted by at least one substituent.

In Formula 3, n may be an integer from 0 to 7, preferably 0 to 5, and more preferably 0 to 3.

Examples of the substituent to substitute alkylene or bivalent aryl are described as above with reference to Formula 1.

In the thiol curing agent represented by Formula 1, $R_1$ to $R_4$ each independently may represent hydrogen, C1 to C4 alkyl or -A-B—C-D-SH, preferably hydrogen, methyl, ethyl or -A-B—C-D-SH.

Further, at least two, preferably at least three of $R_1$ to $R_4$ may be -A-B—C-D-SH, wherein A may be a single bond or C1 to C4 alkylene, B may be —OC(=O) or —O-E-OC(=O)—, C may be a single bond or C1 to C4 alkylene, D may be a single bond or a bivalent moiety represented by Formula 4, and E may be a C1 to C4 alkylene:

[Formula 4]

where n is an integer from 0 to 10, preferably 0 to 7, more preferably 0 to 5, and even more preferably 0 to 3.

Examples of the thiol curing agent represented by the above formula may include, without being limited to, alkoxylated trimethylolpropane tris(3-mercaptopropionate), trimethylolpropane tris(3-mercaptopropionate), or alkylene glycol bis(3-mercaptopropionate), more specifically ethoxylated trimethylolpropane tris(3-mercaptopropionate), trimethylolpropane tris(3-mercaptopropionate), or ethylene glycol bis(3-mercaptopropionate).

In the resin composition, the amount of the thiol curing agent may be properly adjusted in consideration of the equivalent weight of epoxy groups included in the resin or a desired curing rate, without being limited particularly. For example, the resin composition may include 0.1 to 10 parts by weight, preferably 0.5 to 5 parts by weight of the thiol curing agent based on 100 parts by weight of the resin. In the present invention, a ratio of the thiol curing agent to the resin is controlled within the above range, thereby inducing appropriate reaction with an epoxy group or a carbon-carbon double bond in heat curing, properly controlling expression of tact after heat curing, and maintaining superior physical properties including solvent resistance or coatability.

The resin composition of the present invention may further include a photoinitiator. In the present invention, any photoinitiator generally known in the art may be used.

Examples of the photoinitiator may include benzoins, hydroxyl ketones, amino ketones, or phosphine oxides, specifically benzoin, benzoin methyl ether, benzoin ethyl ether, benzoin isopropyl ether, benzoin-n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-morpholino-propane-1-one, 4-(2-hydroxyethoxy)phenyl-2(hydroxy-2-propyl)ketone, benzophenone, p-phenylbenzophenone, 4,4'-diethylamino benzophenone, dichlorobenzophenone, 2-methylanthraquinone, 2-ethylanthraquinone, 2-tert-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenonedimethyl ketal, p-dimethylamine benzoate, oligo(2-hydroxy-2-methyl-1-[4-(1-methylvinyl)phenyl]propanone), and 2,4,6-trimethylbenzoyl-diphenylphosphine oxide, which may be used alone or as mixtures, without being limited thereto.

The photoinitiator may be present in an amount of 1 to 15 parts by weight, preferably 3 to 12 parts by weight, and more preferably 5 to 10 parts by weight, based on 100 parts by weight of the resin. Within this range, the composition can maintain excellent photo-curing efficiency and be prevented from deteriorating in physical properties due to remaining components after curing.

The resin composition may further include multifunctional acrylate. When the resin composition includes a multifunctional acrylate, the hard coating can have a close cross-linking structure after photo-curing and thus have improved physical properties, such as hardness, wear and tear resistance, abrasion resistance, and chemical resistance.

Examples of the multifunctional acrylate may include, without being limited to, bifunctional acrylates, such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, hydroxyl pivalic acid neopentyl glycol di(meth)acrylate, dicyclopentanyl di(meth)acrylate, caprolactone modified dicyclopentenyl di(meth)acrylate, ethyleneoxide modified di(meth)acrylate, di(meth)acryloxy ethyl isocyanurate, allylated cyclohexyl di(meth)acrylate, tricyclodecanedimethanol (meth)acrylate, dimethylol dicyclopentane di(meth)acrylate, ethyleneoxide modified hexahydrophthalic acid di(meth)acrylate, tricyclodecane dimethanol(meth)acrylate, neopentyl glycol modified trimethylpropane di(meth)acrylate, adamantane di(meth)acrylate or 9,9-bis[4-(2-acryloyloxyethoxy)phenyl]fluorene]; trifunctional acrylates, such as trimethylolpropane tri(meth)acrylate, dipentaerythritol tri(meth)acrylate, propionic acid modified dipentaerythritol tri(meth)acrylate, pentaerythritol tri(meth)acrylate, propyleneoxide modified trimethylolpropane tri(meth)acrylate, trifunctional urethane(meth)acrylate or tris(meth)acryloxyethylisocyanurate; tetrafunctional acrylates, such as digylcerin tetra(meth)acrylate or pentaerythritol tetra(meth)acrylate; pentafunctional acrylates, such as propionic acid modified dipentaerythritol penta(meth)acrylate; and hexafunctional acrylates, such as dipentaerythritol hexa(meth)acrylate, caprolactone modified dipentaerythritol hexa (meth)acrylate or urethane(meth)acrylate (e.g, reaction products of an isocyanate monomer and trimethylolpropane tri (meth)acrylate).

Specifically, an acrylate including a ring structure and/or a urethane bond in the molecular structure thereof may be used as the multifunctional acrylate. Due to use of such acrylate, the hard coating layer can have excellent hardness after curing and a high refractive index. In this case, the ring structure included in the acrylate may be a carbocyclic, heterocyclic, monocyclic or polycyclic structure. In detail, examples of the ring structure included in the multifunctional acrylate may include C3 to C12, preferably C3 to C8 cycloalkyl ring structures, such as cyclopentane, cyclohexane, or cycloheptane, and the acrylate may include at least one, preferably 1 to 5, and more preferably 1 to 3 such ring structures and may include at least one hetero atom, such as O, S or N.

Examples of the multifunctional acrylate containing the ring structure may include, without being limited to, a monomer having an isocyanurate structure, such as tris(meth)acryloxyethylisocyanurate, and isocyanurate modified urethane acrylate (e.g., reaction products of isocyanate compounds having a ring structure, such as isoboron diisocyanate, and acrylate compounds, such as trimethylolpropane tri(meth) acrylate or pentaerythritol tri(meth)acrylate).

The multifunctional acrylate may be present in an amount of 30 parts by weight or less, preferably 5 to 15 parts by weight based on 100 parts by weight of the resin. Within this range, the hard coating layer can have superior physical properties, such as hardness.

The resin composition may further include an antioxidant, and thus yellowing of the coating layer may be prevented.

Any antioxidant known in the art may be used, without being limited thereto. For example, phenolic antioxidants, (e.g., IRGANOX, RONOTEC and ETANOX), phosphorus antioxidants (e.g., CYANOX and ULTRANOX), or chelate antioxidants (e.g., IGAFOS) may be used.

The amount of the antioxidant is not particularly limited but may be properly adjusted in view of physical properties of the coating layer. For example, the resin composition may include 0.1 to 2 parts by weight of the antioxidant based on 100 parts by weight of the resin.

The resin composition may further include a lubricant. The lubricant may improve winding efficiency of the coating layer formed of the resin composition, blocking resistance, wear and tear resistance, and scratch resistance. Any lubricant may be used, for example, waxes, such as polyethylene wax, paraffin wax, synthetic wax, and montan wax; and synthetic resins, such as silicon resins or fluoric resins. The lubricant may be present in an amount of 0.5 to 15 parts by weight, preferably 1 to 6 parts by weight based on 100 parts by weight of the resin, without being limited thereto. Within this range, the coating layer can have excellent blocking resistance, abrasion resistance, and scratch resistance while maintaining superior transparency as well.

The resin composition may include a proper amount of a UV absorber in order to improve light resistance. Examples of the UV absorber may include hydroxyphenyl benzotriazole, hydroxyphenyl-S-triazine, or 2-(2'-hydroxy-5'-methacryloxyethylphenyl)-2H-benzotriazole, without being limited thereto. When the UV absorber is included, the amount of the UV absorber is not particularly limited and may be properly adjusted in view of desired physical properties.

In addition to the above components, the resin composition may further include additives generally known in the art, for example, a thermosetting catalyst, such as dimethylaminopyridine (DMAP), fillers, such as nano-silica, an isocyanate compound, etc., without departing from the spirit and scope of the invention.

Another aspect of the present invention provides a sheet for forming a hard coating which includes a base and a coating layer formed on the base and containing a heat-cured product of the resin composition according to the present invention.

The sheet for forming the hard coating of the present invention may be a transfer material or surface protective sheet to form a hard coating on surfaces of various molded products by various methods.

Figure 1:
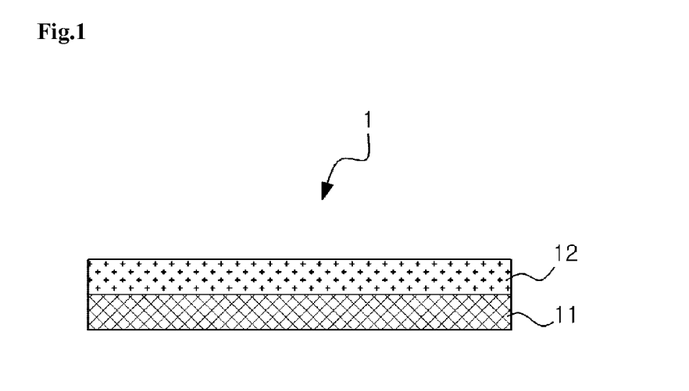
FIGS. 1 to 7 are cross-sectional views of sheets for forming a hard coating according to various embodiments of the present invention.

FIG. 1 is a cross-sectional view of a sheet for forming a hard coating according to an exemplary embodiment of the invention. As shown in FIG. 1, the sheet 1 for forming the hard coating may include a base 11 and a coating layer 12 formed on one side of the base. As needed, the sheet 1 may further include a layer formed on the coating layer 12 or an opposite side of the base 11 to the coating layer 12. In this case, the layer may be any layer generally known in the art including a patterned layer, a deposition layer, or an adhesive layer.

As used herein, the expressions "B formed on A," "B formed on an upper side of A," or "B formed on the surface of A" mean that B can be attached or bonded directly to the surface of A, B can be attached or bonded to A by a pressure-sensitive adhesive or an adhesive, or an intervening layer can be formed between A and B (e.g., A-C—B).

In the sheet for forming the hard coating layer, the coating layer may be a photo-curable type layer, which includes a heat-cured product of the resin composition of the present invention as an effective element. As used herein, the term "heat-cured product of a resin composition" refers to an addition reaction product formed by epoxy groups included in the resin and thiol groups of the thiol curing agent via open ring addition reaction. Further, the term "photocurable type" means that curing reaction may occur by reaction of (meth) acryloyl groups included in the resin when electromagnetic waves are irradiated thereupon. In this case, electromagnetic waves may collectively refer not only to microwaves, infrared light (IR), ultraviolet light (UV), x-rays and gamma ($\gamma$) rays, but also to particle beams, such as $\alpha$-particle beams, proton beams, neutron beams, and electron beams.

The coating layer may be formed, for example, by treating the resin composition containing the above components in proper conditions to form an addition reaction product via addition reaction of epoxy groups of the resin of the composition and thiol groups of the thiol curing agent and applying the composition including the product to the base in a proper manner. In this case, reaction conditions to preform the addition reaction product are not particularly limited and may be properly set in consideration of the amount or kind of the epoxy groups of the resin or the thiol groups of the curing agent. For example, the resin composition is prepared and treated at about 100 to 170° C. for 30 minutes to 2 minutes, thereby forming the addition reaction product.

According to the above process, the coating layer which does not have tack is formed even though a drying process is not included. Accordingly, the present invention enables further formation of additional layers, such as a patterned layer, a deposition layer, or an adhesive layer, on the coating layer or winding of the sheet for forming the hard coating without special equipment for forming a coating layer or a drying process.

The thickness of the coating layer of the sheet for forming the hard coating is not particularly limited but may be properly adjusted in view of desired physical properties.

The base is not particularly limited as to kind. Examples of the base may include resin films containing polypropylene resins, polyethylene resins, polyamide resins, polyester resins, polyacrylic resins, or polyvinyl chloride resins as a main ingredient; metal foils, such as aluminum foil or copper foil; cellulose sheets, such as glassine paper, coated paper, or cellophane; or a complex sheet of at least two thereof. Further, when the sheet for forming the hard coating constitutes a surface protective sheet, the base may include a resin sheet which does not have release properties and contains an acrylic resin, a polycarbonate resin, a vinyl chloride resin, a urethane resin, or a polyester resin as a main ingredient. Further, the thickness of the base is not particularly limited but may be properly adjusted in view of desired physical properties.

When the sheet for forming the hard coating constitutes a transfer material, one or opposite sides of the base are subjected to release coating and the coating layer may be formed on a release coating surface. In this case, a release coating layer may be formed by any method, for example, various printing methods or coating methods using epoxy, epoxy-melamine, aminoalkyd, acrylic, melamine, silicon, fluorine, cellulose, urea resin, polyolefin, paraffin release agents or a complex release agent of at least two thereof.

As needed, the base or the release coating surface may be formed in a photoless form. For example, embossing is conducted or fine powder of calcium carbonate, silica, zinc oxide, magnesium carbonate, polyethylene wax, or glass beads are introduced into the release coating layer to form the photoless type base. Accordingly, in the transfer material, fine uneven parts formed on the release coating surface are transferred to the surface of the coating layer after separating the base, thereby obtaining a molded article having a photoless surface. The photoless surface may be formed entirely or partly on the surface of the base or release coating layer. When "formed partly, the photoless surface may include a material containing the same fine powder as in forming the release coating layer.

The thickness of the release coating layer or photoless layer is not particularly limited and may be properly adjusted as necessary.

Figure 2:
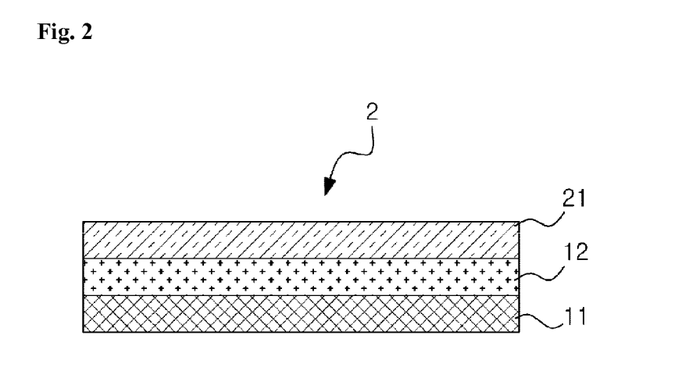
Figure 3:
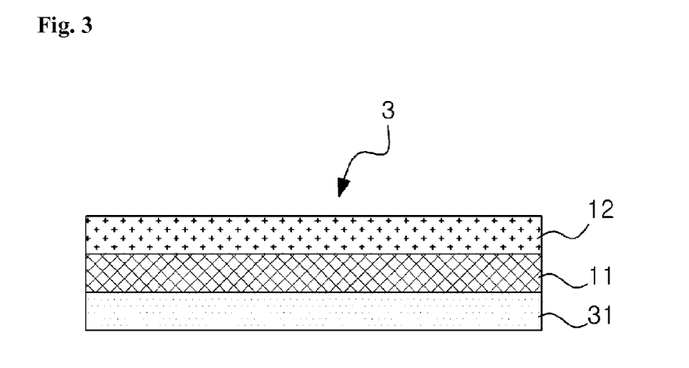

Referring to FIGS. 2 and 3, sheets 2, 3 for forming a hard coating according to the present invention may further include adhesive layers 21, 31 formed on a coating layer 12 or a base 11.

For example, when the sheet 2 is used as a transfer material or surface protective sheet, the adhesive layers 21, 31 may provide adhesive strength to a molded product.

The adhesive layers 21, 31 may be formed of various heat-sensitive or pressure-sensitive resins generally known in the art. For example, the adhesive layers 21, 31 may include a proper material among a polyacrylic resin, a polystyrene resin, a polyamide resin, a chloridized polyolefin resin, a chloridized ethylene-vinyl acetate copolymer resin, and a rubber resin in view of the material quality of an adherend to which the adhesive layers 21, 31 are attached.

Figure 4:
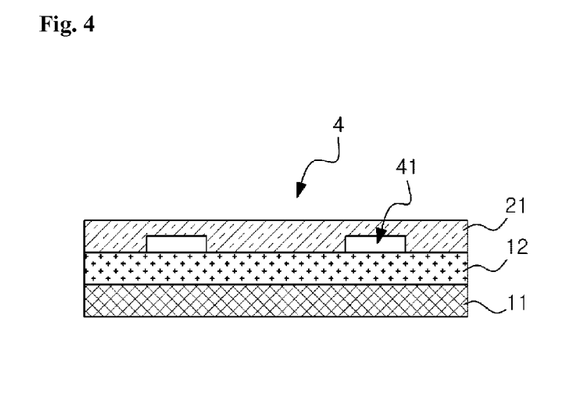
Figure 5:
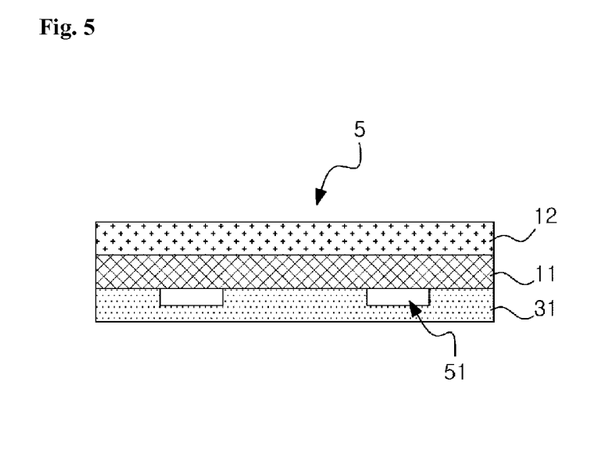

Referring to FIGS. 4, 5, sheets 4, 5 for forming a hard coating according to the present invention may include patterned layers 41, 51 formed on a coating layer 12 or a base 11, and adhesive layers 21, 31 formed on the patterned layers 41, 51. The patterned layers 41, 51 may be formed by any method, without being limited thereto. For example, the patterned layers may be formed using a binder of a polyvinyl resin, a polyamide resin, a polyester resin, a polyacrylic resin, a polyurethane resin, a polyvinyl acetal resin, a polyester urethane resin, a cellulose ester resin, or an alkyd resin and coloring ink including a proper color of pigment or dye. The patterned layers are not particularly limited as to formation methods and thickness and may be properly formed using methods known in the art.

Figure 6:
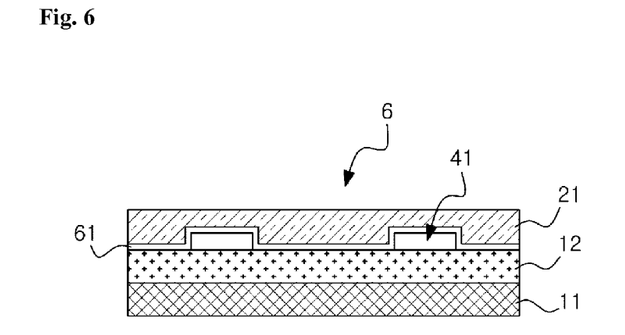
Figure 7:
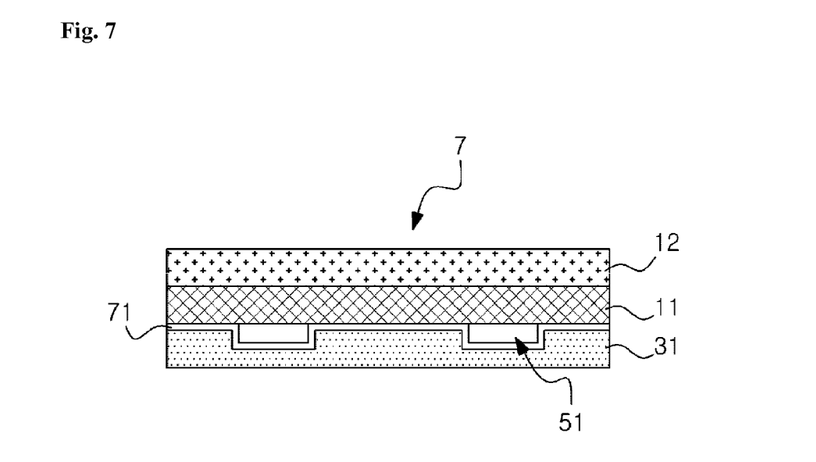

Referring to FIGS. 6, 7, sheets 6, 7 for forming a hard coating according to the present invention may further include deposition layers 61, 71 formed on patterned layers 41, 51. Although FIGS. 6, 7 show that the patterned layers 41, 51 are formed on a coating layer 12 or a base 11 and the deposition layers 61, 71 are formed thereon, the deposition layers 61, 71 may be formed directly on the coating layer 12 or the base 11 without the deposition layers 61, 71 as necessary. The deposition layers may be formed using any material and method generally used in the art, for example by vacuum deposition, sputtering, and the like.

The sheets for forming the hard coating of the present invention may include at least one anchor layer installed in a proper place between the layers. The anchor layer may function to enhance adhesion between the layers of the sheets and to protect a molded article or a patterned layer from chemicals. The anchor layer may be formed, for example, of a two-component urethane resin, melamine or epoxy thermosetting resins, or a thermoplastic resin including a vinyl chloride copolymer resin by a general method.

Still another aspect of the present invention provides a method of forming a hard coating which forms a hard coating on the surface of a molded article using the sheet for forming the hard coating according to the present invention.

The method of forming the hard coating may include various steps depending on a type of a sheet for forming a hard coating.

For example, when the sheet for forming the hard coating is a transfer material, the method may include bonding a coating layer of the sheet or an adhesive layer formed on the coating layer to the surface of a molded article; separating a base; and photo-curing the coating layer through light irradiation.

In the present invention, due to use of the transfer material, a hard coating may be formed on the surface of a molded article concurrently with manufacture of the molded article though injection molding. In this case, the method may include disposing the sheet in a mold, with the coating layer or the adhesive layer, if formed on the coating layer, being disposed inward; injecting a melted resin into a cavity of the mold; separating the base from the sheet; and photo-curing the coating layer through light irradiation.

When the sheet is a surface protection film, the method may include disposing the sheet, with a base or an adhesive layer, if formed on the base, facing the surface of a molded article; heating the sheet to soften the base; vacuum-suctioning the sheet at a lower part to adhere to the surface of the molded article; and photo-curing the coating layer through light irradiation.

In the present invention, due to use of the surface protection film, a hard coating may be formed on the surface of a molded article concurrently with manufacture of the molded article though injection molding. In this case, the method may include disposing the sheet in a mold, with the coating layer or the adhesive layer, if formed on the coating layer, being disposed inward; injecting a melted resin into a cavity of the mold; separating the base from the sheet; and photo-curing the coating layer through light irradiation.

In each method, separating the base and photo-curing may be performed in random order. For example, separating the base may be conducted prior to photo-curing through light irradiation. In the present invention, the base may be formed of a light-transmitting material and the coating layer is cured, followed by separating the base.

Hereinafter, a transfer method of the present invention will be described in detail with reference to the accompanying drawings.

Figure 8:
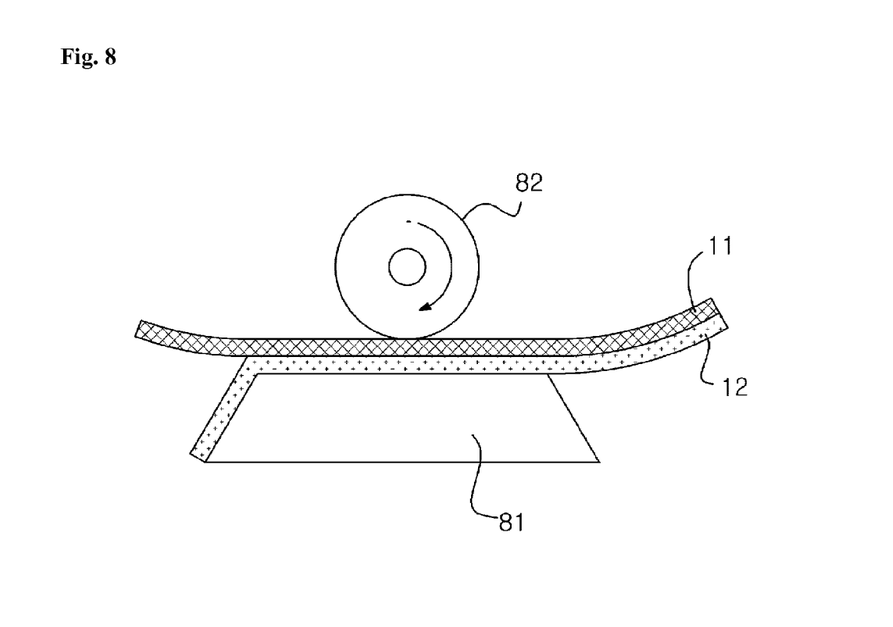
FIGS. 8 to 11 are diagrams of methods of forming a hard coating according to various embodiments of the present invention.

FIG. 8 is a diagram of a transfer method according to an embodiment of the present invention. The method shown in FIG. 8 is effectively employed when a sheet according to the present invention is used as a transfer material (as shown in FIGS. 2, 4, and 6), without being limited thereto.

According to the method, a sheet for forming a hard coating is disposed on a molded article 81, with a coating layer 12 (or an adhesive layer, not shown, if formed on the coating layer 12) being placed at the bottom. Then, heat and/or pressure is applied to a base 11 of the sheet at about 80 to 260° C. and about 50 to 200 kg/m² using a roll transcriber or an up-down transcriber including a heat-resistant rubber elastic member 82, e.g., silicon rubber, by a medium of the heat-resistant rubber elastic member 82. Accordingly, the coating layer 12 or the adhesive layer is bonded to the surface of the molded article 81. Subsequently, the sheet is properly cooled as necessary, and then the base 11 is separated from the coating layer 12. Then, the coating layer 12 transferred to the molded article 81 is photo-cured through light irradiation. As described above, the photo-curing process may be performed before separation of the base 11.

Conditions of photo irradiation are not particularly limited but may be properly controlled in view of a composition of the coating layer.

Further, the material quality of the molded article is not particularly limited. For example, the molded article may include resin products, wooden products, metal products, complex products thereof, or any type of molded products requiring a hard coating. Here, the resin products may include widely used resins, such as a polystyrene resin, a polyolefin resin, an ABS resin, an AS resin, or an AN resin. In addition, general engineering resins, such as a polyphenylene oxide/polystyrene resin, a polycarbonate resin, a polyacetal resin, an acrylic resin, a polycarbonate modified polyphenylene ether resin, a polyethylene terephthalate resin, a polybutylene terephthalate resin, and an ultra-high-molecular weight polyethylene resin; and super engineering resins, such as a polysulfone resin, a polyphenyl sulfide resin, a polyphenylene oxide resin, a polyacrylate resin, a polyether imide resin, a polyimide resin, a liquid crystal polyester resin, and a heat-resistant polyaryl resin, may be used. Furthermore, complex resins containing a reinforcing material, such as glass fiber or inorganic fillers, may be used.

Figure 9:
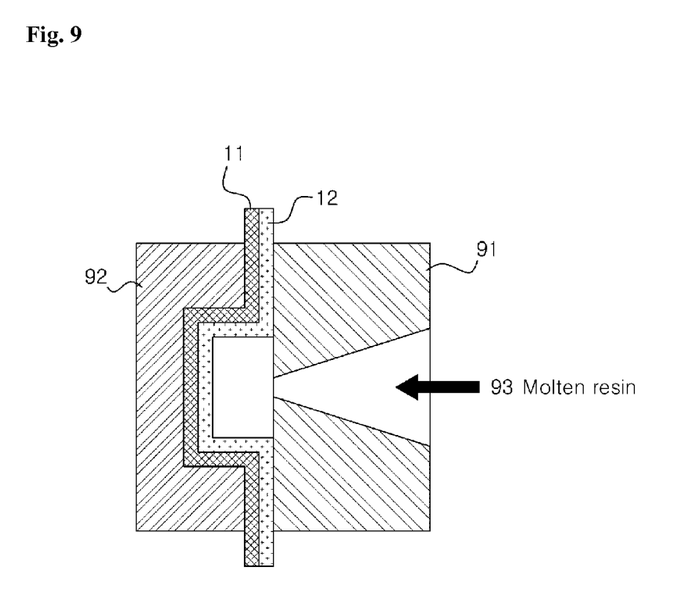

FIG. 9 is a diagram of a transfer method according to another embodiment of the invention, in which molding and transferring are concurrently performed by injection molding, thereby transferring a coating layer to the surface of a molded article.

According to the method, a sheet for forming a hard coating is disposed in a mold including a movable mold 91 and a fixed mold 92 such that a coating layer 12 (or an adhesive layer, not shown, if formed on the coating layer) is disposed inward and a base 11 is placed in contact with the fixed mold 92. Subsequently, the mold is sealed, and then a melted resin 93 is injected into the mold from a gate formed in the movable mold 91 to form a molded article and to bond the coating layer to the surface of the molded article at the same time. Then, after the resin molded article is cooled in proper conditions as necessary, the mold is opened and the resin molded article is taken out. Before or after separating the base 11, the coating layer is cured by light irradiation to form a hard coating.

Figure 10:
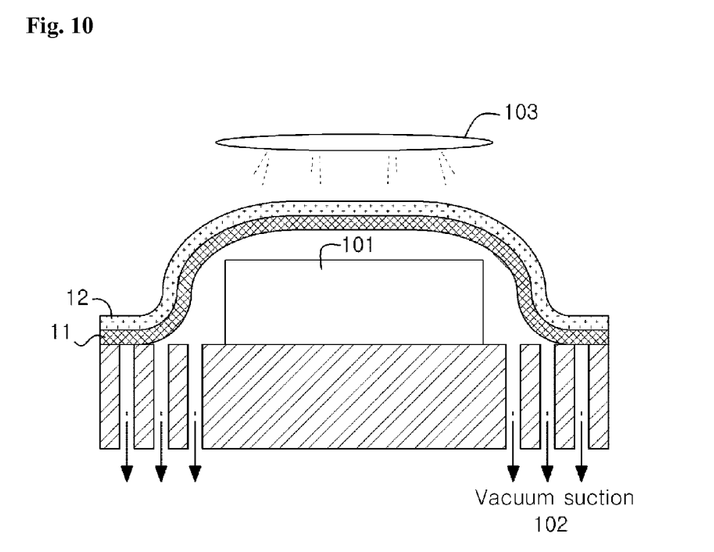

FIG. 10 is a diagram of a method of forming a hard coating effectively employed when a sheet for forming a hard coating is used as a surface protective sheet. According to the method, the sheet for forming the hard coating is disposed on the surface of a molded article 101 such that a base 11 (or an adhesive layer, not shown, if formed on the base 11) is placed at the bottom. Then, the sheet is heated with a heater 103 to soften the base 11 and vacuum-suctioned 102 at a lower side to adhere the same to the molded article 101. The coating layer is photo-cured through light irradiation, thereby forming a hard coating. In this method, heating and vacuum-suctioning the sheet may be performed at the same time, and pressing is conducted from an upper side simultaneously with vacuum-suctioning at the lower side to improve adhesion efficiency. In this case, pressing the sheet for forming the hard coating may be conducted directly using a fluid or using a plastic sheet.

Figure 11:
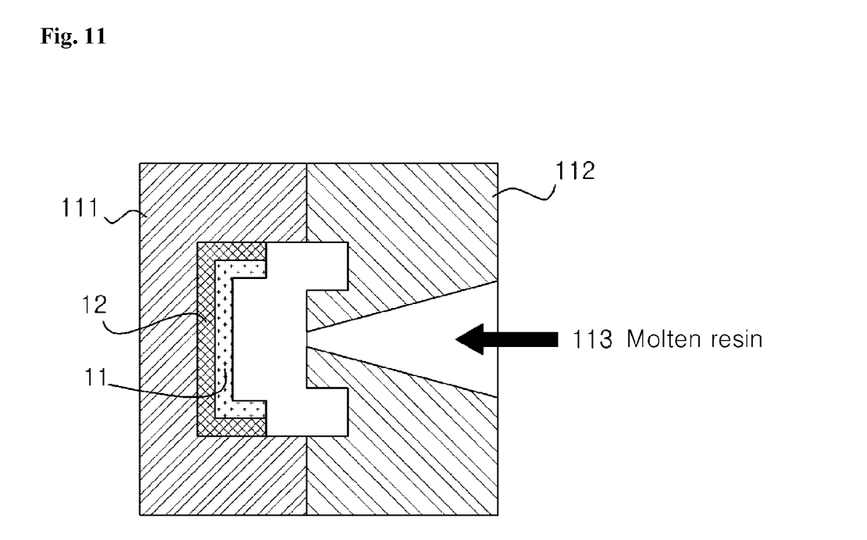

FIG. 11 is a diagram of another method of forming a hard coating when a sheet for forming a hard coating is used as a surface protective sheet, in which molding by injection molding and forming the hard coating are concurrently performed. According to this method, the sheet for forming the hard coating is disposed in a mold including a movable mold 112 and a fixed mold 111 such that a coating layer 12 is placed in contact with the fixed mold 111. The mold is sealed, and then a melted resin is injected 113 from a gate formed in the movable mold 112 to form a molded article and to bond a base of the sheet or an adhesive layer formed on the base to the surface of the molded article at the same time. Then, after the molded article is cooled as necessary, the mold is opened and the molded article is taken out. Subsequently, the coating layer is cured by light irradiation to form a hard coating.

In addition to the above methods, a hard coating may be formed by various methods known in the art.

Advantageous Effects

According to embodiments of the invention, the composition forms a hard coating or a protective layer exhibiting excellent physical properties, such as hardness, wear and tear resistance, abrasion resistance, and chemical resistance, and having superior gloss and a high refractive index. For example, when the composition is applied to a transfer material or a surface protective sheet, the composition exhibits excellent adhesion to another layer, e.g., a print layer, a deposition layer, or an adhesive layer, and has superior hardness, wear and tear resistance, abrasion resistance, and chemical resistance, thereby effectively forming a hard coating or a protective layer having excellent properties on the surface of various molded articles.

BEST MODE

Next, the present invention will be explained in more detail with reference to examples and comparative examples. These examples are provided for illustrative purposes only and are not to be in any way construed as limiting the present invention.

Example 1

Preparation of Resin Having Epoxy Group and (Meth)Acryloyl Group 11 parts by weight of glycidyl methacrylate (GMA), 3 parts by weight of methyl(meth)acrylate (MMA), 6 parts by weight of styrene (SM), 150 parts by weight of butyl acetate (BA), and 0.25 parts by weight of 2,2'-azobisisobutyronitrile (AIBN) were added to a reactor having a stirring device, a cooling pipe, a dropping lot, and a nitrogen introduction pipe. The reactor was heated to about 65° C. over about 1 hour under a nitrogen atmosphere and kept warm for about 9 hours. Then, a mixture including 43 parts by weight of GMA, 12 parts by weight of MMA, 25 parts by weight of SM, 0.5 parts by weight of lauryl mercaptan, and 1 part by weight of AIBN was dripped into the reactor over about 2 hours under a nitrogen atmosphere using the dropping lot, and the reactor was held at the same temperature for about 3 hours. Then, 0.25 parts by weight of AIBS was added to the reactor, which was kept warm for 2 hours. Subsequently, the temperature was adjusted to about 105° C. and the nitrogen introduction pipe was replaced by an air introduction pipe, after which 37 parts by weight of acrylic acid (AA), 0.05 parts by weight of p-methoxyphenol, and 0.04 parts by weight of dimethylaminopyridine (DMAP) were added to and mixed with the product, followed by staying at 105° C. under air bubbling. The mixture was left at the same temperature for 15 hours, 0.05 parts by weight of p-methoxyphenol was added thereto and cooled, and then methyl ethyl ketone was added thereto such that the content of nonvolatile components was 30%, thereby preparing a resin having an epoxy group and an acryloyl group. As a result of chemical analysis through titration, the prepared resin had an epoxy equivalent weight of 6,600 g/eq, an acryloyl equivalent weight of 349 g/eq. and a weight average molecular weight of 60,000 based on a polystyrene standard, measured by GPC.

Preparation of Coating Solution 5 parts by weight of ethoxylated trimethylolpropane tris(3-mercaptopropionate) as a thiol curing agent, 20 parts by weight of dipentaerythritol hexaacrylate (DPHA), 5 parts by weight of a 1,6-hexane isocyanate trimer, 8 parts by weight of a photoinitiator, 1 part by weight of an antioxidant, 20 parts by weight of nanosilica, and 70 parts by weight of methyl ethyl ketone were mixed with 100 parts by weight of the resin, thereby preparing a coating solution.

Preparation of Sheet for Forming Hard Coating

A melamine release agent was applied to a thickness of about 1 μm to one side of a polyethylene terephthalate (PET) film having a thickness of 38 μm as a base using gravure coating, thereby forming a release layer. The prepared coating solution was applied to a thickness of about 6 μm to the release layer using micro-gravure coating. Then, the applied coating solution was heated at 150° C. for 30 seconds to cause reaction of epoxy groups of the resin and thiol groups of the thiol curing agent, thereby forming a heat-cured product. Then, an anchor layer (acrylic anchor layer), a patterned layer (acryl-urethane ink), a vacuum-deposition layer (acrylic resin deposited primer), and an adhesive layer (acrylic adhesive) were sequentially formed on the coating layer including the heat-cured product using micro-gravure printing, thereby manufacturing a sheet for forming a hard coating.

Formation of Hard Coating

A hard coating was formed on the surface of a molded article by applying the prepared sheet to the method illustrated in FIG. 9. In detail, the sheet was disposed such that the base was placed in contact with the fixed mold 92, followed by injection of a melted resin, separation of the base, and UV irradiation, thereby forming the hard coating. Here, molding was carried out under the following conditions: the temperature of the resin was about 280° C., the temperature of the mold was about 60° C., and the pressure of the resin was about 1,600 kg/cm$^2$. Further, UV was irradiated at 1,000 w/cm for about 3 seconds with a lamp from a height of about 10 cm.

Example 2

A composition and sheet for forming a hard coating were prepared in the same manner as in Example 1 except that ethylene glycol bis(3-mercaptopropionate) was used as a thiol curing agent instead of ethoxylated trimethylolpropane tris(3-mercaptopropionate), and a hard coating was formed on the surface of a molded article using the sheet.

Example 3

A composition and sheet for forming a hard coating were prepared in the same manner as in Example 1 except that trimethylolpropane tris(3-mercaptopropionate) was used as a thiol curing agent instead of ethoxylated trimethylolpropane tris(3-mercaptopropionate), and a hard coating was formed on the surface of a molded article using the sheet.

Example 4

A composition and sheet for forming a hard coating were prepared in the same manner as in Example 1 except that pentaerythritol tetrakis(3-mercaptopropionate) was used as a thiol curing agent instead of ethoxylated trimethylolpropane tris(3-mercaptopropionate), and a hard coating was formed on the surface of a molded article using the sheet.

Example 5

A composition and sheet for forming a hard coating were prepared in the same manner as in Example 1 except that pentaerythritol tetrakis(3-mercaptoacetate) was used as a thiol curing agent instead of ethoxylated trimethylolpropane tris(3-mercaptopropionate), and a hard coating was formed on the surface of a molded article using the sheet.

Comparative Example

A composition and sheet for forming a hard coating were prepared in the same manner as in Example 1 except that a urethane curing agent, diisocyanate, was used instead of a thiol curing agent, and a hard coating was formed on the surface of a molded article using the sheet.

The compositions for coating prepared in Examples and Comparative Example were evaluated as to physical propertirs (pencil hardness), and results are shown in Table 1.

1. Pencil Hardness

Each of the compositions prepared in Examples 1 to 5 and the Comparative Example was applied to a thickness of 6 μm to a 2 mm-thick poly(methyl methacrylate) (PMMA) substrate using bar coating. Subsequently, the product was heat-cured at 160° C. for 40 seconds and then cured by UV irradiation (1,000 mW). Then, the pencil hardness of each product was evaluated at a load of 1 kg using a pencil hardness tester (Coretech Co.) and a Mitsubishi pencil for measuring hardness.

TABLE 1

|  | Example | | | | | Comparative |
| --- | --- | --- | --- | --- | --- | --- |
|  | 1 | 2 | 3 | 4 | 5 | Example |
| Pencil hardness (H) | 5 | 5 | 5.5 | 6 | 5.8 | 4 |

As shown in Table 1, when the compositions for forming a hard coating according to the present invention are used, a hard coating having an effectively high hardness is formed.

The invention claimed is:

1. A resin composition for forming a hard coating, comprising:
   a resin having an epoxy group and a (meth)acryloyl group; and
   a thiol curing agent,
   wherein the resin has an epoxy equivalent weight of 4,000 to 8,000 g/eq, a (meth)acryloyl equivalent weight of about 100 to 1,000 g/eq, and a weight average molecular weight of about 10,000 to 100,000.

2. The resin composition of claim 1, wherein the resin has a weight average molecular weight of about 10,000 to 80,000.

3. The resin composition of claim 1, wherein the thiol curing agent comprises at least one selected from the group consisting of ethoxylated trimethylolpropane tris(3-mercaptopropionate), trimethylolpropane tris(3-mercaptopropionate), glycol di(3-mercaptopropionate), pentaerythritol tetrakis(3-mercapto-propionate), 4-mercaptomethyl-3,6-dithia-1,8-octanedithiol, pentaerythritol tetrakis(3-mercapto acetate), trimethylolpropane tris(3-mercapto acetate), 4-t-butyl-1,2-benzenedithiol, 2-mercaptoethylsulfide, 4,4'-thiodibenzenethiol, benzenedithiol, glycol dimercaptoacetate, glycol dimercaptopropionate ethylene bis(3-mercaptopropionate), polyethylene glycol dimercaptoacetates, and polyethylene glycol di(3-mercaptopropionates).

4. The resin composition of claim 1, wherein the thiol curing agent is represented by Formula 1:

where $R_1$ to $R_4$ each independently represent hydrogen, alkyl, alkoxy, alkenyl, alkynyl, or a thiol containing group, and at least two of $R_1$ to $R_4$ represent a thiol containing group.

5. The resin composition of claim 4, wherein the thiol containing group is represented by Formula 2:

-A-B—C-D-SH, where A is a single bond or alkylene, B is —NH(C=O)—, —OC(=O), —O-E—OC(=O)—, —SC(=O)—, or —OCH$_2$—, C is a single bond or alkylene, D is a single bond or a bivalent moiety represented by Formula 3, and E is alkylene:

where P represents bivalent aryl, and n is an integer from 0 to 10.

6. The resin composition of claim 4, wherein $R_1$ to $R_4$ each independently represent hydrogen, C1 to C4 alkyl or -A-B—C-D-SH, and at least two of $R_1$ to $R_4$ comprise -A-B—C-D-SH, in which A is a single bond or C1 to C4 alkylene, B is —OC(=O) or —O-E-OC(=O)—, C is a single bond or C1 to C4 alkylene, D is a single bond or a bivalent moiety represented by Formula 4, and E is C1 to C4 alkylene:

where n is an integer from 0 to 10.

7. The resin composition of claim 1, wherein the thiol curing agent is present in an amount of 0.1 to 10 parts by weight based on 100 parts by weight of the resin.

8. The resin composition of claim 1, further comprising a photoinitiator.

9. The resin composition of claim 8, wherein the photoinitiator is present in an amount of 1 to 15 parts by weight based on 100 parts by weight of the resin.

10. The resin composition of claim 1, further comprising a multifunctional acrylate.

11. The resin composition of claim 10, wherein the multifunctional acrylate is present in an amount of 30 parts by weight or less based on 100 parts by weight of the resin.

12. The resin composition of claim 1, further comprising an antioxidant.

13. The resin composition of claim 12, wherein the antioxidant comprises phenolic antioxidants, phosphorus antioxidants, or chelate antioxidants.

14. The resin composition of claim 12, wherein the antioxidant is present in an amount of 0.1 to 2 parts by weight based on 100 parts by weight of the resin.

15. The resin composition of claim 1, further comprising a lubricant, a UV absorber, a thermosetting catalyst, or fillers.

16. A sheet for forming a hard coating comprising:
    a base; and
    a coating layer formed on the base and comprising a heat-cured product of the resin composition of claim 1.

17. A method of forming a hard coating comprising: forming a hard coating on a surface of a molded article using the sheet for forming the hard coating of claim 16.

* * * * *